June 11, 1968          W. LEHMANN          3,387,633
METHOD OF AND DEVICE FOR MAKING SPRING CORES FOR
SPRING CORE MATTRESSES Filed Nov. 24, 1965          5 Sheets-Sheet 1

Inventor:
Walter Lehmann
By

United States Patent Office 3,387,633
Patented June 11, 1968

3,387,633
METHOD OF AND DEVICE FOR MAKING SPRING CORES FOR SPRING CORE MATTRESSES
Walter Lehmann, Pfleidelsheim, Germany, assignor to Gottlob Gussmann, Suddeutsche Bettpolsterfabrik, Pfleidelsheim, Germany
Filed Nov. 24, 1965, Ser. No. 509,594
15 Claims. (Cl. 140—3)

ABSTRACT OF THE DISCLOSURE

Method and apparatus for winding the ends of fine wires interconnecting adjacent springs of a spring core about the legs of the springs at the edges of the core in which a rotary tool having a radially opening V-shaped notch is engaged with the spring leg and rotated to wrap the fine wire about the spring leg.

---

The present invention relates to a method of and device for making spring cores for spring core mattresses, according to which wire springs are wound preferably in the form of a rectangle and are arranged in spaced relationship to each other, whereupon they are interconnected by means of fine connecting wires. Finally, the respective end of each fine connecting wire, which end protrudes beyond the outermost spring, is wound around the leg of the spring winding located in the plane of said fine connecting wire.

In this connection, it is known, following the interconnecting of the individual springs, manually to bend over the protruding ends of the fine connecting wires and to wind the same around the corresponding legs or windings of the springs. However, this operation is rather time-consuming and depends to a great extent on the skill of the operator because the wound fine wire ends must not stand away from the spring core inasmuch as otherwise they woud pierce the mats or the like to be arranged on the spring core.

It is, therefore, an object of the present invention to provide a method of and device for making spring cores for spring core mattresses, which will overcome the above-mentioned drawback.

It is another object of this invention to provide a method of making spring cores for spring core mattresses which will greatly simplify the manufacture of such spring cores.

It is also an object of this invention to provide a method as set forth in the preceding paragraphs which will permit winding the ends of the fine connecting wire of the spring core in a very simple manner around the corresponding legs of the springs.

It is still another object of this invention to provide a method as set forth in the preceding paragraph which will make it possible to wind the fine connecting wire ends around corresponding legs of the spring in a semi or fully automatic working operation.

These and other objects and advantages of the invention will appear more clearly from the following specification in connection with the accompanying drawings, in which:

FIGURE 1 diagrammatically illustrates a view of a winding tool according to the present invention;

FIGURES 2 and 3 respectively illustrate the winding tool according to FIGURE 1 into different working positions;

Figure 1:
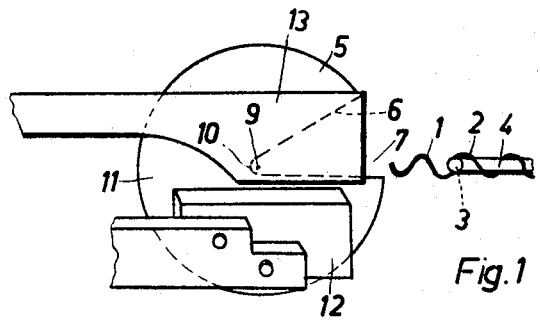

The present invention concerns a method of making spring cores for spring core mattresses, according to which springs of wire are wound preferably in form of rectangles, and these springs are arranged in spaced relationship to each other and interconnected by fine connecting wires whereupon the respective end of each connecting wire which protrudes beyond the outermost spring is wound around the leg of that winding of the spring which is located in its plane. This method is, according to the present invention, characterized in that the spring leg around which the fine wire end is to be wound, and the fine wire end are moved through the slot of a tool in the axis of rotation thereof, whereupon the fine wire end is wound around the spring leg by turning the tool. This will assure that the fine wire end will be firmly extended around the corresponding spring leg without the necessity of applying any material work.

According to a further feature of the present invention, the fine wire end is, during the movement of the spring leg, placed in the axis of rotation of the tool against an end face of the tool while pressure is applied so that the fine wire end which in this way engages the end face of the tool as soon as the latter, after the tool has started its rotative movement, passes into the range of the fine wire end.

In order to obtain a spring core with uniform properties, the protruding fine wire ends are, prior to the winding operation, cut to a certain length corresponding to the length of the spring leg.

According to a further feature of the present invention, the springs are first in separate spring rows connected by fine wires with the respective serially arranged springs whereupon the protruding fine wire ends are wound, whereupon a plurality of spring rows arranged one adjacent to the other are interconnected by transversely extending fine connecting wires and subsequently, the protruding ends of said wires are wound. This is particularly advantageous when the spring windings of the springs of respective adjacent spring rows extend in opposite direction with regard to each other. In such an instance, following the interconnection of the spring rows by transversely extending fine wires, two fine wires each will approximately be directed adjacent to each other.

Advantageously, during the feeding of the spring core, the tool will be at a standstill so that the spring core can be fed in a safe manner.

It has proved advantageous, following the feeding of the spring core, to feed the tool in the direction of the axis of rotation of the working tool transverse to said feeding movement toward said spring core until the respective leg of the spring will be located in the axis of rotation of the tool. Advantageously, during the feeding of the spring core or during the transverse movement of the work tool, the slot of the tool is closed so that the protruding end of the respective fine wire will be unable, prior to the starting of the respective movement of the tool, to enter the slot thereof.

According to a further suggestion of the present invention, the spring core, preferably the spring of the spring core around which the fine wire has to be passed is prior to the initiation of the winding operation, centered with regard to the tool so that at any rate, the precisely correct spring will cooperate with the tool.

A device for carrying out the method according to the present invention is characterized by at least one driven tool which is rotatably journalled and provided with a winding surface arranged transversely to the direction of rotation of the tool. The said tool is rotatable coaxially with regard to the outer legs of the outer windings of at least one portion of the spring core. In order to wind the respective protruding fine wire end around the respective spring, said wire end is placed upon the winding surface so that it will be rotated by said winding surface and wound around the respective spring leg.

Expediently, the winding surface is formed by one inner surface of a slot which latter is advantageously of a V-shape with the tip of said V-shaped slot leading into a recess located in the axis of rotation of the tool, said recess corresponding to the diameter of the spring wire plus the double diameter of the fine connecting wire. The leg around which the fine wire is to be passed is moved in said recess so that the winding tool can rotate unimpededly and can move the protruding fine wire end.

According to a further feature of the present invention, that end face of the slotted winding tool which is the first end face when looking in the feeding direction of the spring core, is provided with a pressing tool for the fine wire end to be wound around the leg of the spring. This tool is preferably designed in the form of a plate and is adapted to press the fine wire end against the end face of the winding tool until the slot has passed by the fine wire end and thereby the said end is pressed into the slot. Expediently, the pressing tool is controlled through the intervention of a cam or the like by the rotary movement of the winding tool, said pressing tool being tiltable about an axis which is approximately parallel to the end face of the winding tool. The cam control will assure a precise working of the pressing tool.

According to a further development of the present invention, the first end face of the winding tool, when looking in the feeding direction of the spring core, has arranged thereon a lock, for instance in the form of a metal sheet, which, when feeding a spring core, places itself in front of the slot of the winding tool. This lock is likewise cam controlled and is tiltable in a plane parallel manner with regard to the corresponding end face of the winding tool. This locking plate will, during the feeding of the spring core, place itself in front of the slot of the winding tool so that the protruding fine wire end cannot unintentionally get into the slot of the winding tool.

According to a further suggestion of the present invention, a centering device is adapted to adjust the spring core prior to the winding operation relative to the winding tool. By means of this centering device, a precise location of the respective spring around which the wire is to be wound will be assured with regard to the winding tool. Advantageously, the said centering device is formed by a fork which preferably enters the spring core from above and has a substantially U-shaped cross-section and in centering position engages the spring around which the wire is to be wound on that side of said spring which is located opposite to the winding tool. When the spring core is fed in the direction of the axis of rotation of the winding tool, the centering fork stabs from above into the spring core in the described manner whereupon the winding tool moves in a direction transverse to its axis of rotation toward the spring core while the spring around which the wire is to be wound will be held in its position by the U-shaped centering fork. A particularly advantageous embodiment of the invention is realized when the centering device is connected to a shiftable clutch located between the winding tool and the drive therefor, and when said clutch is engaged only during the centering position of the frictionally driven centering device. When the spring around which the wire is to be wound following the feeding step is incorrectly located with regard to the winding tool, the frictionally driven centering device cannot stab the entire spring core so that also the rotary movement of the winding tool will not be initiated.

The movement or displacement of the winding tool in a direction transverse to its axis of rotation is controlled through the intervention of a cam, while said winding tool is horizontally displaceable in a bearing support.

According to a still further development of the present invention, the device of the invention comprises a feeding arrangement for the stepwise advancement of the spring core by means of which the spring core is stepwise fed toward the winding tool or tools in such a way that, in succession, all protruding fine wire ends will be wound around the spring.

Advantageously, the feeding arrangement is formed by a table with guiding means for the spring core and by feeding means. The feeding means are advantageously formed by abutment means extending through the table from below and movable back and forth.

It has proved advantageous to arrange the feeding means which feed the respective springs to the winding tool, in a radial projection of the winding tool because in such an instance these feeding means will engage that spring row of the spring core which extends transversely to the feeding direction and the outer springs of which will get the thin wire wound around, whereby said springs will also, when greater tolerance differences prevail in the distance between the springs of the spring core, be able to be moved into the precise intended position with regard to the winding tool or tools.

According to still another feature of the present invention, both sides of the feeding device have arranged thereon winding tools so that both sides of the spring core can be machined in one working operation. According to a further development of the invention, for a spring core with fine wires superimposed upon each other in three planes, two winding tools are arranged one above the other and one is moved in feeding direction with regard thereto while the distance of the tools located one behind the other in feeding direction corresponds to one or a plurality of times of the distance of the springs of said spring core from each other. In this way, with each working cycle, three fine wires are performing their winding operation in different planes.

In order to be able to cut off the protruding fine wire ends prior to the winding over a predetermined length, at least one cutting device is provided ahead of the winding tools when looking in feeding direction, while the distance of said cutting device from the winding tool corresponds to one or more times the distance of the springs of said spring core from each other.

Figure 2:
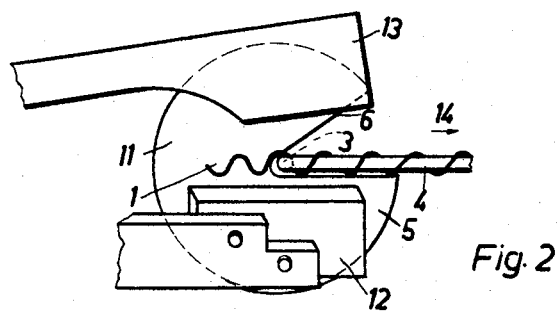
Figure 3:
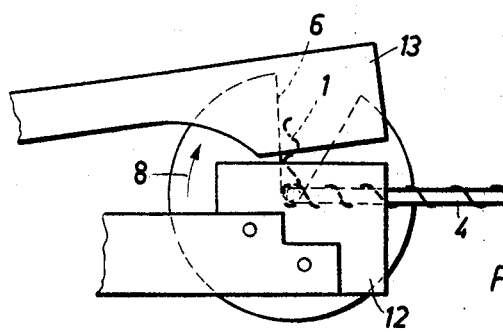

Referring now to the drawings in detail, FIG. 1 shows a wheel 5 which is rotatable about its axis for winding the protruding end 1 of a fine wire 2 about one leg 3 of a spring 4 pertaining to a spring core (not further illustrated in FIGS. 1 to 3). Wheel 5 has a winding surface 6 which is formed by a V-shaped slot 7 and is located transversely to the direction of rotation, which latter is indicated by the arrow 8. V-shaped slot 7 extends to the axis of rotation 9 of winding tool 5 and has a rounded tip 10 the diameter of which corresponds to the diameter of the spring leg 3 plus twice the diameter of the fine wire 2.

At one end face 11 of the winding tool 5 there is provided a pressing plate 12 which is pivotable about an axis parallel to the end face 11 of winding tool 5. Furthermore, a blocking plate 13 is pivotable in the plane of the end face 11 of winding tool 5, said blocking plate being tiltable about an axis which is parallel to the axis 9 of winding tool 5.

The spring core which comprises springs is moved perpendicularly with regard to the drawing plane, and in conformity with FIGS. 1 to 3 in the direction of the axis of rotation 9 of winding tool 5 toward the winding tool 5. When the respective protruding fine wire end 1 is approximately in the plane of the end face 11 of the winding tool 5, the winding tool 5 will be moved transversely to the leg 3 of spring 4 toward said spring in the direction of the arrow 14, while blocking plate 13 is located in front of slot 7. This movement of winding tool 5 will be continued until it occupies the position shown in FIG. 2 in which leg 3 of spring 4 around which leg the fine wire end is to be wound, is located in the axis of rotation 9 of winding tool 5.

Blocking plate 13 will prevent the protruding fine wire end 1 from getting into slot 7 during the movement of the winding tool 5 in the direction of the arrow 14. Blocking plate 13 moves during or after winding tool 5 moves in the direction of the arrow 14, to the position shown in FIG. 2. Pressing plate 12 will be tilted into the position of FIG. 3 in such a way that the end 1 of fine wire 2 which protrudes beyond axis of rotation 9 will be pressed against the end face 11 of winding tool 5.

With the now starting rotary movement of winding tool 5 in the direction of the arrow 8, slot 7 is passed by end 1 of the fine wire which is pressed against the end face 11 of winding tool 5 so that said end 1 which engages the winding tool 5 while being under pressure will spring into slot 7 and will be winding surface 6 be moved in the direction of the arrow 8 about leg 3 of spring 4 and will thus be wound around said leg 3.

As soon as end 1 of fine wire 2 has been wound around leg 3, the winding tool 5 returns in a direction opposite to the direction of the arrow 14 to its starting position so that by movement of the spring core in the direction of the axis 9 of winding tool 5, the next protruding end 1 of a fine wire can be moved into the working range of the winding tool 5.

Figure 4:
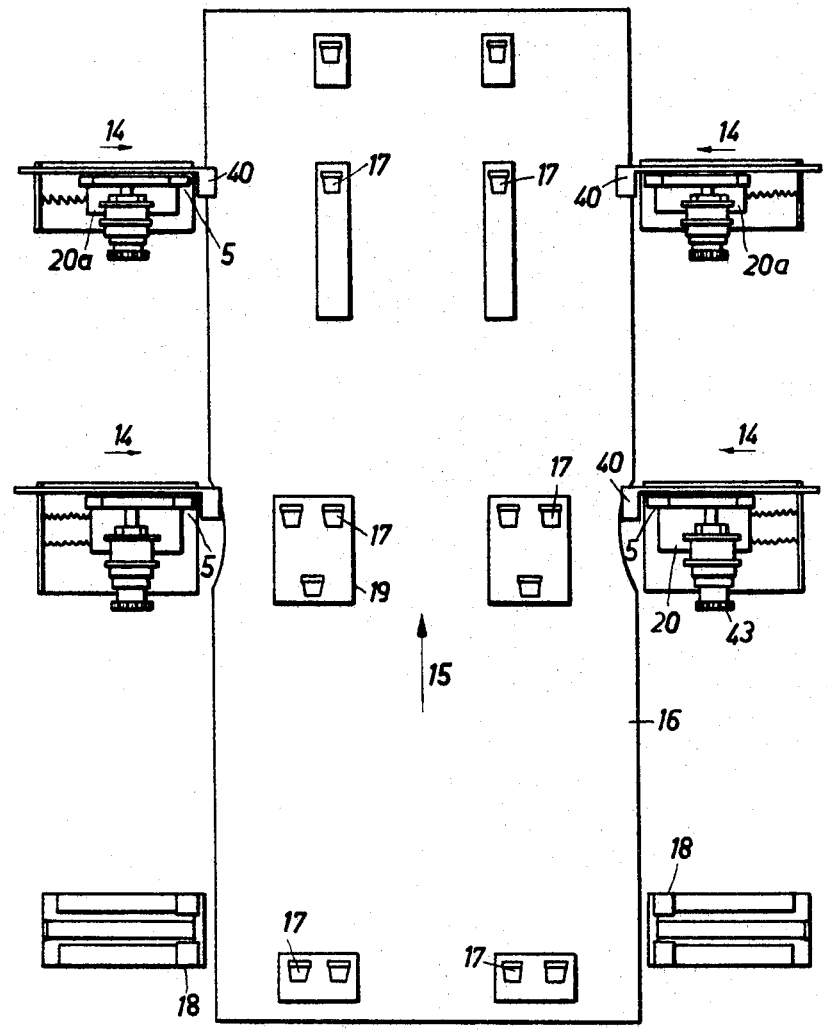
FIGURE 4 is a greatly simplified top view of a device according to the invention which comprises a plurality of winding tools.

As will be evident from FIG. 4, a plurality of winding tools 5 are arranged on the left and right-hand side of a transporting table 16 on which the spring core (which is not illustrated further in detail) is moved in steps by feeding means 17 in the direction of arrow 15 on rotation of the winding tools 5.

At the start of the transporting table 16, there are on the left-hand and right-hand sides thereof provided two holding tools 18 adapted to cut the protruding ends 1 of the fine wires 2 of the spring core to a predetermined length. Table 16 is provided with a plurality of transporting means which are formed by abutments 17 tiltable in the transporting direction indicated by the arrow 15. These transporting means extend from below through corresponding cutouts in table 16 while a plurality of abutments transverse to the transporting direction 15 are provided adjacent to each other within the range of the cutting tools 18 and the winding tools 5. In this way, the spring core to be moved in the transporting direction 15 will be moved further by abutments 17 along the spring rows transverse to the transporting direction 15. The outermost springs 4 of said rows of springs and fine wire ends 1 are to be worked by the tools 18 and 15.

As furthermore indicated in FIGS. 4 to 7, the winding tools are mounted on supports 20 which by means of a cam disc 21 against the thrust of pressure springs 22 are movable back and forth in carriage guiding means 23 in a direction transverse to the direction 15 of the spring core and in the direction of the arrow 14.

Figure 5:
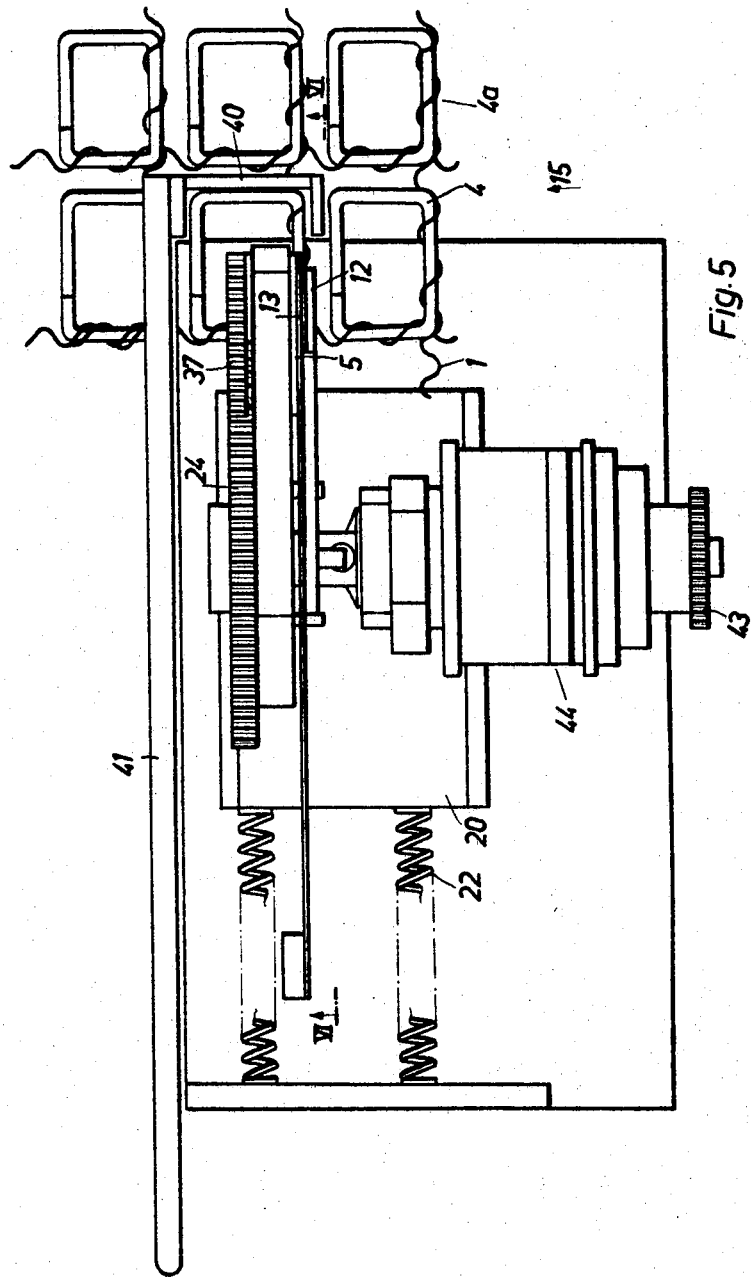
FIGURE 5 illustrates a portion of FIG. 4 but on a considerably larger scale than that of FIGURE 4.
Figure 6:
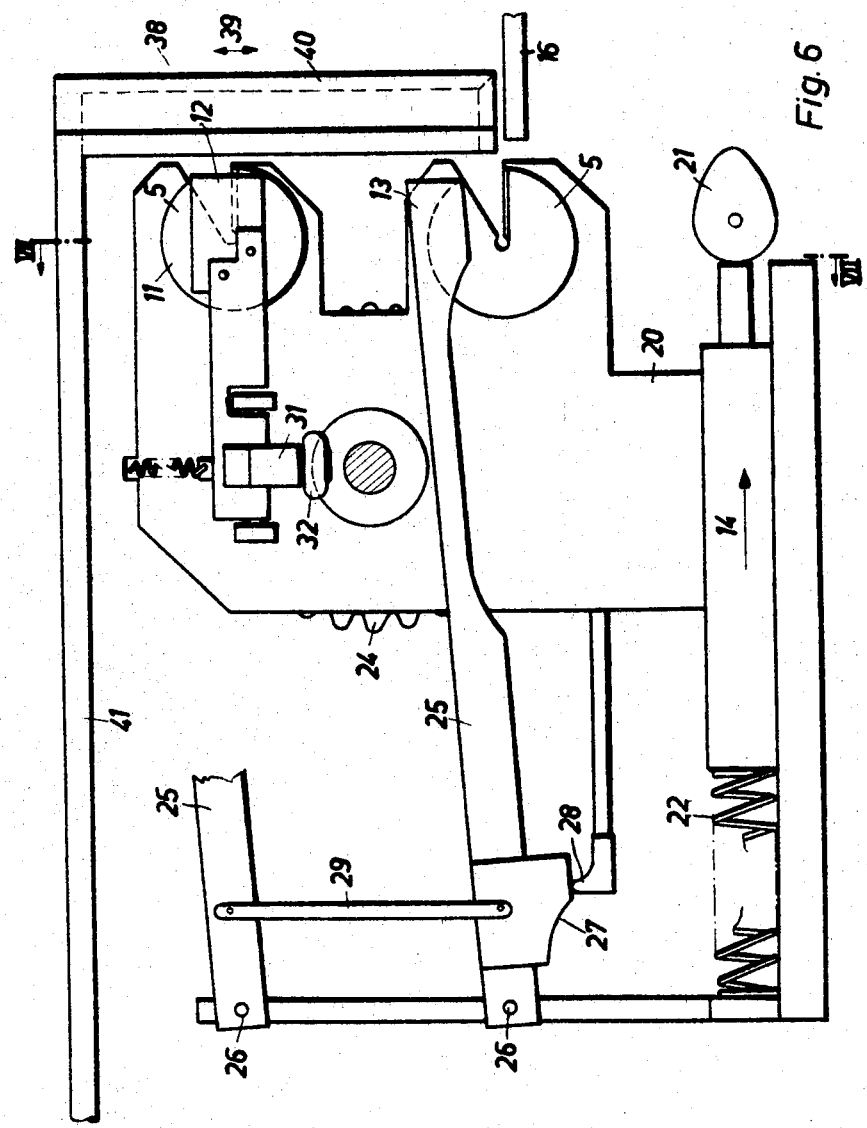
FIGURE 6 is a section taken along the line VI—VI of FIGURE 5.
Figure 7:
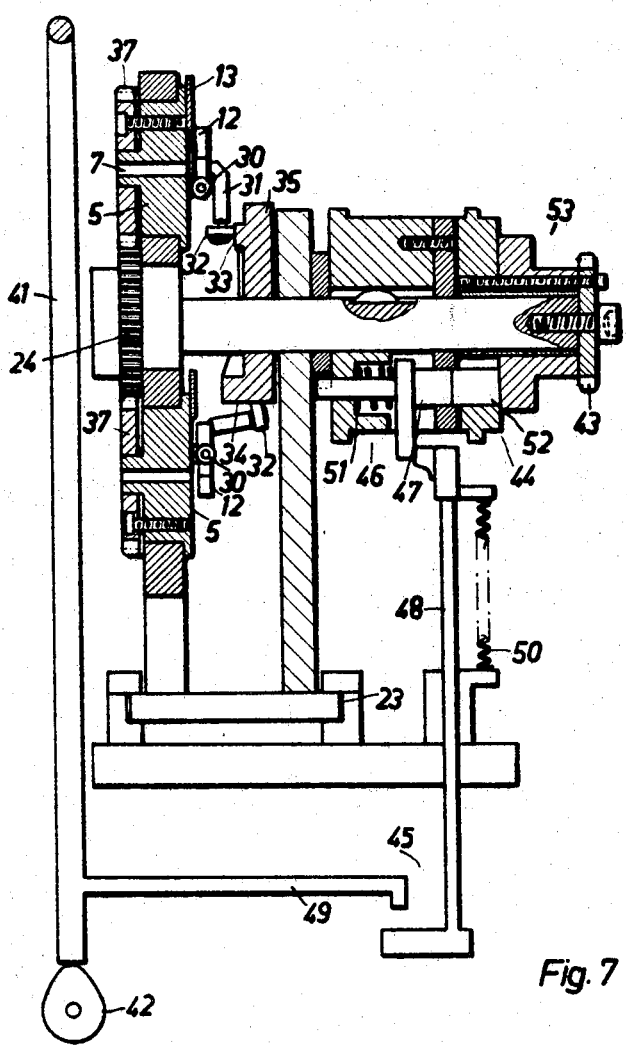
FIGURE 7 is a section along the line VII—VII of FIGURE 6.

According to the embodiment illustrated in FIGS. 5 to 7, support 20 has two winding tools 5 arranged in superimposed position, which tools are driven by a gear 24 common thereto. Blocking plates 13 of the two winding tools 5 are by means of arms 25 mounted for pivotal movement about pivots 26. Arm 25 of the lower blocking plate 13 is provided with a cam 27 engaged by a cam 28 fixedly connected to support 20. Arm 25 of the upper blocking plate 13 (not shown in FIG. 6) is by means of a lever system 29 drivingly connected to the other blocking plate 13.

As will be evident from FIGS. 6 and 7, pressing plates 12 of the two superimposed winding tools 5 are pivotally connected to support 20 for tilting movement about shafts 30 which latter are arranged parallel to the end faces 11 of the winding tools 5. For the sake of clarity, FIG. 6 shows only the pressing plate 12 of the upper winding tool 5. Each pressing plate 12 has an arm 31 which has mounted thereon a roller 32 engaging cams 33, 34. Of cams 33, 34, cam 33 is associated with the upper pressing plate 12 and designed as an axial cam, whereas the other cam 34 is designed as a radial cam. Cams 33 and 34 are provided on a cam body 35 which is mounted on shaft 36 of gear 24 which meshes with gears 37 of the winding tools 5.

Within the range of the commonly driven winding tool 5, the arrangement has a centering device 38 formed by a centering fork 40 which is movable in the direction of the arrow 39 perpendicularly to the transporting table 16. Centering fork 40 which, by means of an arm 41 is mounted on the device for movement in a direction perpendicular to the direction of the arrow 39, has a U-shaped cross-section while the diameter of said U-shaped cross-section corresponds to the dimensions of spring 4 of the spring core 4a indicated in FIG. 5.

When spring core 4a is moved in the transporting direction 15 by a further step, the centering fork 40 which is drivingly connected through arm 41 and cam 42 will, due to its own weight, move into the spring core 4a in such a way that it partially extends around the spring 4 on that side of said spring which is located opposite to the winding tool 5 whereby said spring is held fast relative to the movements of the winding tool 5.

As is furthermore shown in FIG. 7, between driving gear 24 which meshes with gears 37 of winding tools 5, and a sprocket wheel 43 for driving gear 24 there is provided a control clutch 44. Clutch 44 is adapted by means of centering fork 40 and a control linkage 45 to be shifted in such a way that clutch 44 will be engaged only when the centering fork 40 occupies its centering position shown in FIG. 6.

According to the embodiment shown in FIG. 7, the clutch 44 has one clutch member 46 provided with a spring-urged control cam 47 which, by means of an abutment arm 48 movable against the spring thrust, will be held in its disengaged position. Abutment arm 48 is connected to arm 41 of fork 40 by means of a control arm 49. When centering fork 40, due to its own weight, moves downwardly in the direction of the arrow 39, abutment arm 48 will, against the thrust of spring 50 be moved by control arm 49 whereby control cam 47 of clutch 44 will be freed and will, due to the thrust of a pressure spring 51 acting thereupon, be moved into a corresponding recess 52 of the other clutch member 53 so that the winding tools 5 may be driven through sprocket wheel 43.

When, on the other hand, spring core 4a occupies an incorrect position with regard to winding tools 5 in such a way that the centering fork 40 cannot by its own weight move into spring core 4a, clutch 44 will not be engaged, so that damage to spring core 4a by the winding tool 5 will be prevented.

When withdrawing centering fork 40 from the spring core after fine wire 1 has been wound around the respective spring leg, also clutch 44 will be disengaged by the spring-urged abutment arm 48 so that the winding tools 5 will stand still and spring core 4a can be moved forward in transporting direction 15 by a further step.

According to the embodiment shown in FIG. 4, the two first supports 20, when looking in the transporting direction 15, have two superimposed winding tools 5 according to FIGS. 5 to 7. The supports 20a which, when looking in the transporting direction are located behind said supports 20 have each one winding tool only which, when looking in the transporting direction 15 are located between the winding tools 5 of the first support 20. In this way, the winding arrangement according to FIG. 4 can be employed for working spring cores in which the fine wires are located in three super-imposed planes.

It is, of course, to be understood, that the present invention is, by no means, limited to the particular arrangement shown in the drawings, but also comprises any modifications within the scope of the appended claims.

I claim:

1. The method of making spring cores for spring core mattresses wherein the mattress springs, preferably wound square, are arranged in spaced aligned relation in longitudinal and transverse rows, and are interconnected by wires extending longitudinally and transversely of the spring core with each end of each of said wires being connected to the leg of the pertaining spring at the edge of the spring core, said method comprising; assembling each wire with the spring core with each end of the wire extending beyond the outer leg of the pertaining spring at the edge of the core, cutting off the wires after assembly thereof with the springs to leave the wire ends projecting a predetermined amount beyond the edge of the spring core, presenting a rotatable slotted tool with the slot foremost to said spring core and with the axis of rotation of the tool at right angles to the length of the wire, said tool being presented in about the plane of said wire and spaced from the wire and spring, advancing the tool toward the spring core to engage the outer leg of the spring about which the wire is to be wound in the slot while preventing the projecting end of the wire from entering said slot with said leg of said spring during the advancing of the tool, and rotating the tool on said spring leg while engaging the wire in the slot of the tool, to wind the wire around the leg of the spring and thereby secure the wire to the spring.

2. The method according to claim 1, which includes pressing the wire against the face of the tool whereby the wire will spring into the slot when the tool rotates and be wound thereby about the leg of the spring.

3. The method according to claim 2 in which a plurality of said wires are assembled with said spring core and the spring core is advanced stepwise in the direction of the axis of rotation of said tool to align successive ones of said wires with said tool for respective winding operations.

4. The method according to claim 3 which includes assembling rows of springs and wires and then disposing the assembled rows of springs in parallel spaced relation, connecting the rows by wires extending at right angles to the wires connecting the springs in rows, and winding the ends of last mentioned wires about the adjacent legs of springs along the outer edges of the assembly.

5. An apparatus for assembling spring cores for mattresses, said cores comprising springs arranged in longitudinal and transverse rows and wires extending longitudinally and transversely of the core interconnecting the springs and the ends of the wires being connected to the outer legs of the pertaining springs at the edges of the core, said apparatus comprising a slotted tool adapted for engagement with a said outer leg of a spring with said leg in the slot of the tool, means for rotating said tool on the axis of said spring leg after engagement of the tool with the spring leg, said tool being adapted to receive the end of the wire pertaining to the spring in said slot to thereby wind the wire about said spring leg as the tool rotates on the spring leg, said slot being substantially V-shaped and one side of the slot forming a winding surface for engagement with the wire, said slot terminating at the apex in a rounded recess coaxial with the axis of rotation of the tool and of a diameter about equal to the diameter of said spring leg plus twice the diameter of said wire, said tool having one flat end face which is disposed in about the plane of said wire when the tool is presented to the core, a blocking plate adjacent said one end face of the tool and moveable into blocking position to block entry of the wire into the slot during advance of the tool into engagement with the spring, and means for moving said blocking plate into blocking position during advance of said tool and out of blocking position during rotation of said tool.

6. An apparatus according to claim 5 which includes a presser plate also adjacent said end face of the tool, and means for moving said presser plate into position to press the wire against the said end face of the tool whereby the wire will spring into the slot of the tool when the tool is rotated.

7. An apparatus according to claim 6 in which cams are provided operatively connected with said blocking plate and said presser plate and operable to tilt said blocking plate into and out of blocking position in a plane parallel to said end face of the tool and to tilt said presser plate toward and away from said end face of the tool.

8. An apparatus according to claim 7 which includes a centering member operable to engage the spring about a leg of which the wire is to be wound, said centering member engaging said spring in a region spaced from said leg and supporting the spring and holding it in a predetermined position during the winding operation.

9. An apparatus according to claim 8 in which said centering device is fork shaped and is reciprocable into and out of engagement with said spring core, and normally disengaged clutch means controlling the said tool and operated into engaged position by said centering device to permit driving of said tool when the centering device is in engagement with the spring core.

10. An apparatus according to claim 9 in which said apparatus includes a support for the spring core, said winding tool being disposed laterally of said support, means supporting the tool for movement toward and away from said support, and cam means operable for moving said tool toward and away from said support.

11. An apparatus according to claim 10 in which said support includes feeding means engageable with said spring core for advancing the spring core on the support to align the wires to be wound with the winding tool, and guide means to guide the spring core during advancing movement thereof on said support.

12. An apparatus according to claim 11 in which a plurality of winding tools are provided arranged along opposite sides of said support and each operable to wind a different wire end about a spring leg.

13. An apparatus according to claim 12 in which said winding tools on each side of the support include one pair of superposed tools arranged at respectively different wire levels and another winding tool spaced from said pair of tools and at a different level, the spacing of said other tool from said pair of tools being a multiple of the distance of the wires from each other in the feeding direction of said spring core whereby all of the tools can operate simultaneously to wind different wires on respective springs.

14. An apparatus according to claim 11 which includes a cutting station adjacent said support in advance of the winding tool operable for cutting the wire off so that a predetermined length thereof projects from the core for winding on the pertaining spring leg.

15. A tool for winding a small wire around a larger wire which extends at right angles thereto comprising; a member having a flat face parallel to said small wire, a notch in said member adapted to receive said larger wire therein, means rotatably supporting said member for rotation on the axis of the larger wire when the latter is disposed in said notch, means for engaging said small wire with said notch whereby rotation of said member will wind the small wire on the larger wire, said member being longer in the direction of the length of said larger wire than the length thereof about which the small wire is to be wound, said notch being V-shaped and having a rounded apex with a diameter equal to the diameter of the larger wire plus twice the diameter of the small wire, a blocking plate adjacent said flat face to block off the notch against entry of said small wire when the larger wire enters said notch, and a presser plate also adjacent said flat face for pressing the small wire into said notch when the member rotates.

References Cited

UNITED STATES PATENTS

| | | | |
|---|---|---|---|
| 1,993,189 | 3/1935 | Stackhouse | 140—3 |
| 3,297,059 | 1/1967 | Trotta | 140—24 |
| 3,316,944 | 5/1967 | Goldmeyer et al. | 140—92.3 |

CHARLES W. LANHAM, *Primary Examiner.*

L. A. LARSON, *Assistant Examiner.*